(No Model.) 2 Sheets—Sheet 1.

W. DICKINSON.
COMBINED SEEDING AND CULTIVATING MACHINE.

No. 388,026. Patented Aug. 21, 1888.

Witnesses:
E. E. Johnson.
G. A. Winans.

Inventor.
William Dickinson,
per L. L. Morrison, Attorney.

N. PETERS, Photo-Lithographer, Washington, D. C.

(No Model.) 2 Sheets—Sheet 2.
W. DICKINSON.
COMBINED SEEDING AND CULTIVATING MACHINE.
No. 388,026. Patented Aug. 21, 1888.
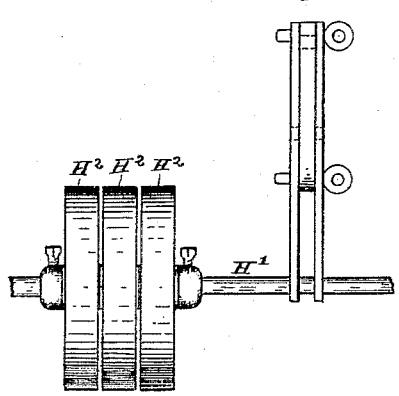
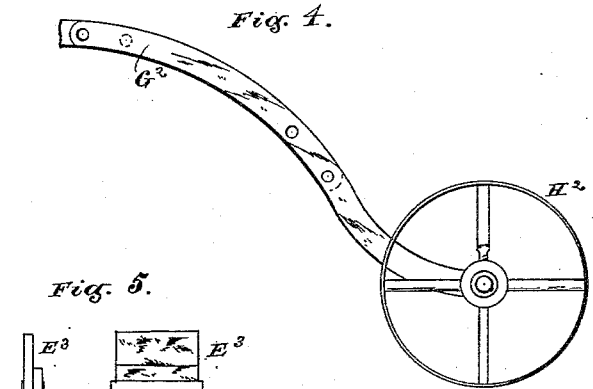
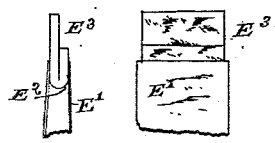
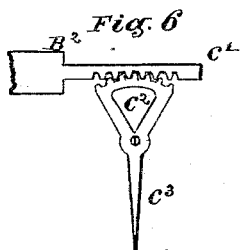
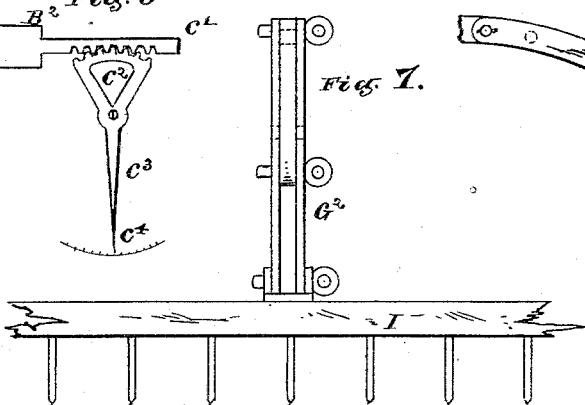
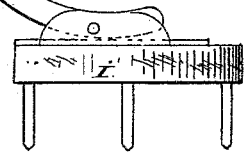
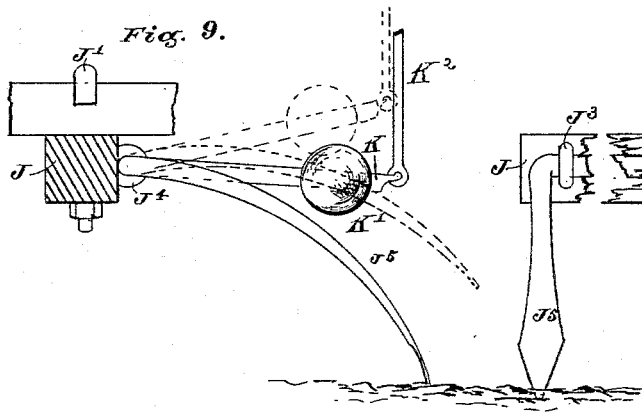
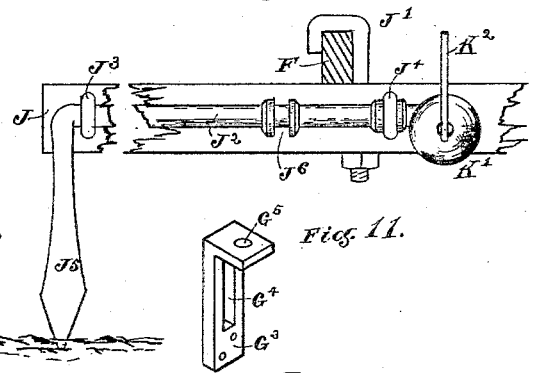
Witnesses:
E. E. Johnson.
G. A. Winans.
Inventor.
William Dickinson,
per L. L. Morrison, Attorney.

UNITED STATES PATENT OFFICE.

WILLIAM DICKINSON, OF ROCKFORD, ILLINOIS.

COMBINED SEEDING AND CULTIVATING MACHINE.

SPECIFICATION forming part of Letters Patent No. 388,026, dated August 21, 1888.

Application filed November 16, 1886. Serial No. 219,079. (No model.)

*To all whom it may concern:*

Be it known that I, WILLIAM DICKINSON, a subject of the Queen of Great Britain and Empress of India, residing at Rockford, in the county of Winnebago and State of Illinois, have invented certain new and useful Improvements in Combined Seeding and Cultivating Machines, of which the following is a specification.

This invention relates to new and useful improvements in a combined seeding and cultivating machine for the better seeding and cultivating of wheat and other grains, for which Letters Patent of the United States No. 282,614, dated August 7, 1883, were granted to myself, (which see for a detailed description of the original machine.)

This invention consists in constructing and adapting a new and useful adjustable section-roller, marker, and harrow to my original machine.

This invention possesses other and further advantages, hereinafter described, and pointed out in the claims.

The invention may be more fully understood by reference to the accompanying drawings, in which—

Figure 1:
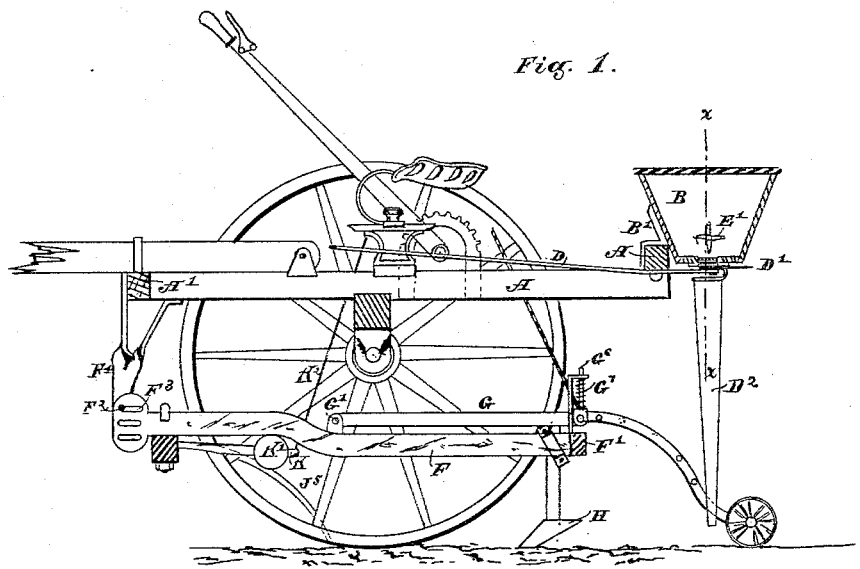
Figure 2:
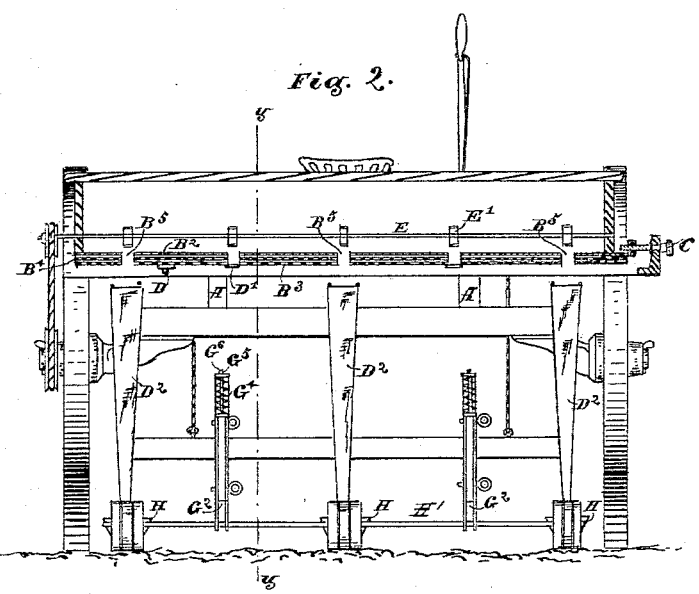

Figure 1 represents a view of a longitudinal section of my combined seeder and cultivator through line $y$ of Fig. 2, provided with my improved section-rollers and adjustable marker. Fig. 2 represents a view of a rear elevation of the same, having a part thereof vertically sectioned through the line $x$ of Fig. 1. Figs. 3 and 4 represent, respectively, a view of a rear and a side elevation of the section-rollers and the parts for connecting them with the machine. Fig. 5 represents a view of radial agitator-arms. Fig. 6 represents an indicator. Figs. 7 and 8 represent, respectively, a rear and an end elevation of a pulverizing-harrow. Figs. 9 and 10 represent, respectively, an end and side elevation of an adjustable marker. Fig. 11 represents a view in detail of a portion of the machine.

Like letters of reference indicate corresponding parts throughout the several views.

A A′ represent, respectively, pairs of horizontal parallel bars secured together to form the main frame of the machine.

B represents a seed-hopper fastened to the bar A by means of brackets B′. The bottom of the seed-hopper is provided with two sliding plates, $B^2 B^3$, and one stationary plate, $B^4$.

$B^5$ represents seed-openings through the plates $B^2 B^3 B^4$ and the bottom of the seed-hopper. The size of the seed-openings $B^5$ is regulated by means of a thumb-screw, C, which operates the slide $B^2$. The latter is provided with a toothed bar, C′, which engages with a toothed quadrant, $C^2$, to which is attached a hand, $C^3$, which accurately indicates upon a dial, $C^4$, the size of the seed-openings $B^5$ whenever the thumb-screw C is turned either forward or backward.

D represents a lever connected with the lower slide, $B^3$, by means of which the operator may instantly close or open all the seed-openings $B^5$.

D′ represents small slides for closing any single seed-opening.

$D^2$ represents detachable seed-spouts, which may be readily connected with the bottom of the seed-hopper B below any one of the seed-openings $B^5$.

E represents a shaft extending lengthwise through the seed-hopper B.

E′ represents radial arms projecting from the shaft E. The free ends of the radial arms E′ are provided with sockets $E^2$, into which are set rubber tips. The latter are of great utility, for as they propel the seed through the seed-openings they do not crush or break the kernels of grain, or in any manner injure the germs thereof.

F F′ represent, respectively, the sides and cross-pieces of a carrying-frame, which is articulated by means of a bolt, $F^2$, and slot $F^3$ to the hanger $F^4$.

G represents bars hinged at G′ to allow them upward and downward motion and having their free ends curved downward.

$G^2$ represents curved pieces secured to the curved portions of the bars G.

$G^3$ represents a guide provided with a slot, $G^4$, and eye $G^5$.

$G^6$ represents a pintle secured to the bar G and passed through the eye $G^5$ of the guide $G^3$.

$G^7$ represents a spiral spring coiled about the pintle $G^6$.

H represents plows having double shares for forming shallow drills in the surface of the ground preparatory to introducing seed.

H' represents a horizontal rod passed transversely through the lower ends of the curved pieces G².

H² represents section-rollers for covering the grain after it has fallen into drills made by the plows H. The section-rollers perform the further office of pressing the earth closely down upon the seed, so that it cannot be scattered by the wind or washed away by rain after it is sown. When the rollers H² are made in sections, as shown, the soil will not adhere to their peripheries and cover them with packed and uneven masses of earth.

I represents a harrow for pulverizing and cultivating purposes and for covering seed when sown broadcast. The section-rollers may be readily exchanged for the harrow whenever it is desired.

J represents a horizontal bar secured to the side F of the carrying-frame by means of clamps J'.

J² represents a rock-shaft having a bolt-eye, J³, and hook J⁴ for a bearing.

J⁵ represents a tooth for marking the surface of the ground to enable the operator to make his drills straight.

J⁶ represents a transverse groove in the rock-shaft J². The rock-shaft J², with its tooth J⁵, may be moved endwise either toward the right or left by loosening the nut (not shown) on the end of the hook J⁴ and introducing the latter into another groove, J⁶, in the rock-shaft.

K represents an arm secured rigidly to the rock-shaft J².

K' represents a weight attached to the arm K.

K² represents a handle for raising the tooth J⁵ from the ground.

I claim—

1. The combination, with the main frame A A', of the seed-hopper B, secured thereto, the adjustable seed-spouts D², depending from said seed-hopper, the bars G, the curved pieces G², the horizontal rod H', and section-rollers H², substantially as described, and for the purpose specified.

2. The combination, with the bar J, of the rock-shaft J², provided with the transverse grooves J⁶ and marking-tooth J⁵, the arm K, weight K', and handle K², substantially as set forth.

In testimony whereof I have affixed my signature in the presence of the two subscribing witnesses.

WILLIAM DICKINSON.

Witnesses:
C. C. BRIGGS,
L. L. MORRISON.